Aug. 19, 1941.    R. B. EVERSON    2,252,883
FLOW METERING APPARATUS
Filed Nov. 3, 1939
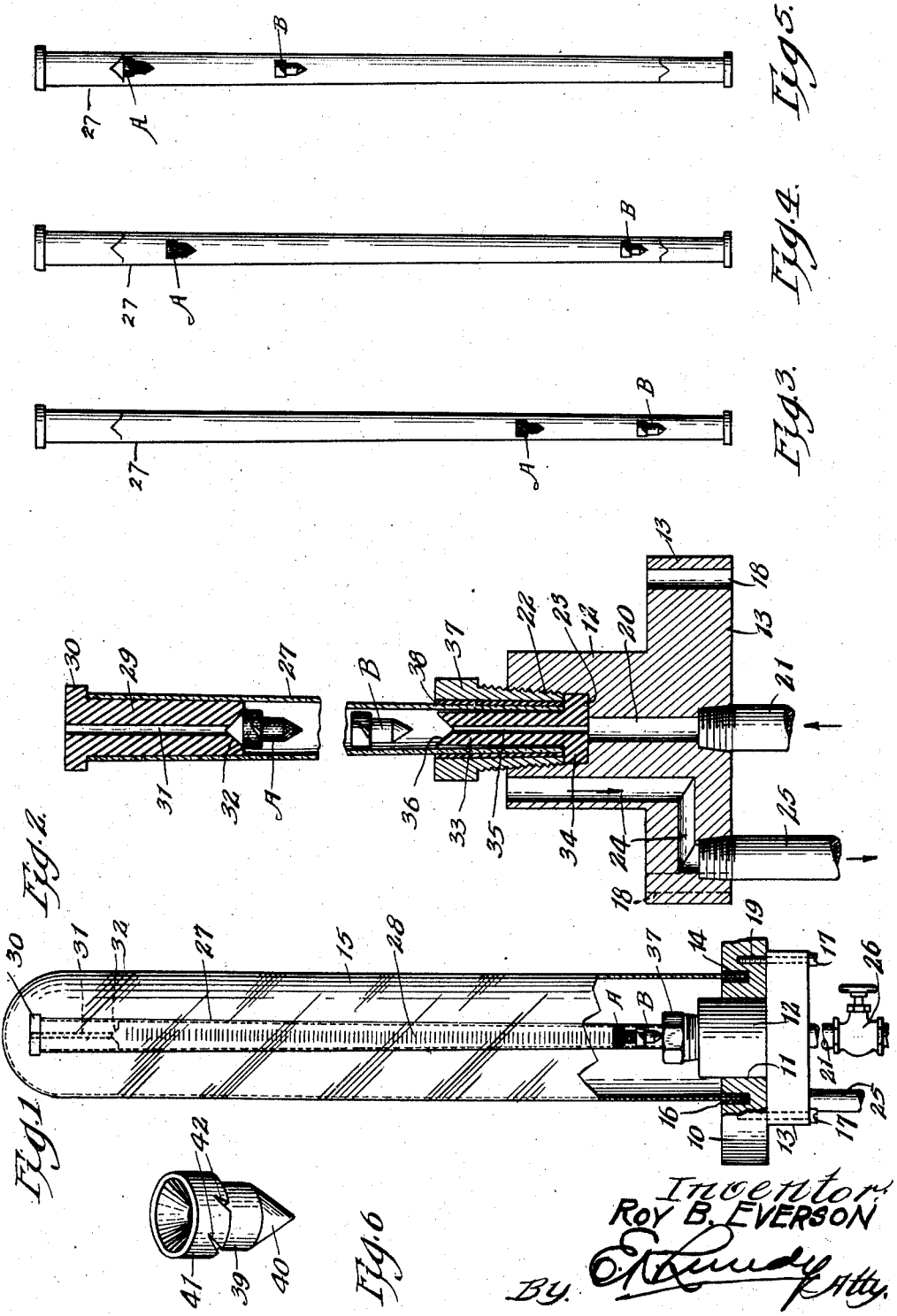
Inventor
Roy B. Everson Patented Aug. 19, 1941

2,252,883

UNITED STATES PATENT OFFICE 2,252,883

FLOW METERING APPARATUS

Roy B. Everson, Chicago, Ill.

Application November 3, 1939, Serial No. 302,738

2 Claims. (Cl. 73—209)

My invention relates to flow-metering apparatus for measuring fluid moving through a conduit or the like. More specifically the present invention relates to improved means for accurately indicating the rate of flow of a gas, such as chlorine gas, from the source of supply to the point of delivery into the water that is being treated or into the solution which is discharged into the water.

The instrument embodies a translucent tube that is provided with a suitable scale and in which there are a plurality of indicating floats that are raised or lowered according to the pressure or rate of movement of the fluid passing through the tube. These floats are of different weights and are finely proportioned the one with respect to the other. Normally, when not in use, the floats are superimposed, the one upon the other, with the lighter float resting upon the lower heavier float in the lower portion of the tube. When the flow of fluid begins, the upper float rises in proportion to increases of pressure or speed of flow. Prior to the point on the scale where the initial float approaches its limit of upward travel the heavier float will begin its upward movement from the bottom of the tube, so that the two movements overlap a short period and thereafter the readings are to be taken from the position of the heavier float. Thus, the operations of the two floats overlap in a dependable manner so that a wide range of flow may be accurately read on the scale.

Stops are provided at opposite ends of the tube to maintain both floats visible at all times regardless of the proportionate flow of the gas. The floats may be contrasting in color in order to clearly distinguish them, and said floats are provided with means whereby the movement of the fluid may be caused to spin the floats when they are moving upward in the tube. The bore of the tube increases in diameter towards its upper or discharge end so that the space between the rotor or float and the inner surface of the tube increases as the float is moved upward by the increasing flow with the result that the respective positions of the floats are in direct relation to the different rates of flow of the fluid. The scale is metrically calibrated in order to readily ascertain the number of pounds of chlorine passing through the metering device in a given period of time such as in each twenty-four hours.

In devising my present apparatus I have numerous objects in mind, one of such objects being to produce a device that is novel in its construction and in the arrangement of its parts. Other objects are to provide a flow-metering device that is accurate and dependable in its operation, and also has a wider range measurement than has heretofore been possible to attain in the use of prior available devices of this character. My apparatus is made of sturdy parts that are designed to withstand severe usage, and the device is comparatively economical to produce so that it may be retailed for a reasonable price. Further objects and advantages will be apparent to persons skilled in the art after the construction and operation of my invention is understood from the herein disclosure.

I prefer to attain the various objects of my invention, and to practice the same in substantially the manner hereinafter described and as more particularly pointed out in the appended claims. Reference is made to the accompanying drawing, in which:

Figure 1 is a vertical elevation, partly in section, showing my flow-metering device.

Figure 2 is an axial section of the upper and lower end portions of the device shown in Figure 1, drawn to an enlarged scale and with the glass housing or dome omitted.

Figures 3, 4 and 5 are diagrammatic views showing relative positions of the indicating devices from a low point on the scale to a high point thereon to illustrate the overlapping periods of activity of these indicating devices.

Figure 6 is a view in perspective showing one of the indicating devices or floats drawn to an exaggerated scale to disclose the details thereof.

The drawing, it will be understood, is more or less schematic for the purpose of disclosing the principles and the manner of operating my flow-metering device, and in these drawings a typical embodiment of my invention is shown. Like reference characters are used to identify like parts wherever such parts appear in the different views. The portions of the device which come into contact with the chlorine gas are made of materials such as hard rubber, glass and the like that are not attacked by this chemical element, and the metallic parts are made of silver or are sufficiently silver-plated to insure against attack by the chlorine.

Referring first to Figures 1 and 2, the numeral 10 designates an annular block of hard rubber or similar material that is circular in outline and is provided with a central opening 11 to surround the cylindrical embossment 12 in the central portion of a similar but smaller block 13. The block 10 has an annular channel 14 in which the lower edge of an elongated glass dome 15 is seated and which is hermetically sealed in said channel by a suitable plastic material 16. The two blocks 10 and 13 are drawn together by screws 17 that pass upwardly through smooth holes 18 in the lower block 13 and screw into tapped holes 19 in the block 10 so that the abutting faces of these blocks are tightly drawn together to prevent leakage between them. The block 13 and its embossment 12 have a central bore 20 affording an entrance passageway communicating at its lower end with the feed pipe 21. The upper portion of this bore is enlarged and threaded as at 22 and provides a seat or shoulder 23 as shown in Figure 2. An irregular shaped bore 24 extends down through the embossment 12, eccentric to passageway 20 and affords an outlet passageway from the interior of glass housing or dome that communicates at its lower end with the outlet pipe 25. The pipe 21 leads from any suitable source of supply of chlorine gas or other fluid, and the flow into the pipe 21 is regulated and controlled by a hand valve 26. The pipe 25 leads, either directly or indirectly, to the point of delivery into the water that is being treated or into the solution which is later discharged into the water.

In order to readily ascertain and note the quantity or rate of flow of the fluid I have provided the novel structure which will now be described. This structure embodies an elongated glass tube 27, the interior of which is tapered from a narrow lower end to a wider upper end, and suitable metric calibrations in the form of a scale 28 are etched or otherwise placed upon the tube for convenient reading. The upper end of the tube is provided with a plug 29, preferably of hard rubber or other suitable material that has a slightly enlarged head 30 extending over the end of the tube and said plug is also provided with an axial bore 31 extending longitudinally through it. The outside dimensions of the plug 29 are such that it may be pushed into the bore of the tube 27 and be frictionally retained therein. At its inner or lower end the plug has a transverse V-shaped channel 32 that provides a widened mouth for the bore, the purpose of which will later be described.

The lower end of the tube is provided with a plug 33 having an enlarged head 34 and it is axially bored as at 35, all similar to the upper plug 29, and like the other plug it is made of hard rubber or other suitable material. The head 34 of the lower plug extends across the lower end of the tube and at its inner or upper end this plug is provided with a V-shaped transverse channel 36. The elongated portion of the plug 33 is truly cylindrical, its outside diameter being only slightly less than the narrowest inside diameter of the lower end of the tube in order to facilitate its insertion therein. When assembled in the bore of the block, the head 34 of the lower plug is seated upon the annular shoulder 23, hereinbefore described, and its bore 35 will then aline with and communicate with the entrance passageway 20 as shown in Figure 2.

The tube 27 is preferably mounted in the widened bore 22 in the embossment 12 of the block 13. This widened bore 22 is tapered and threaded and is of greater diameter than the outside diameter of the lower end of the tube. A packing nut 37 having a threaded tapered exterior surrounds the lower portion of the tube with an annular or cylindrical packing 38 interposed between these parts. The gland nut 37 is then screwed into the tapered bore 22 and squeezes the packing against outside of the tube. The lower edge of the gland nut 37 impinges upon the adjacent extended portion of the head 34 of the plug and urges said head against the shoulder 23 until it is firmly seated. Thus the tube is held in an upright position in the block 13 and sealed against leakage around its outer face.

The chlorine gas or other fluid, admitted in the desired quantities, passes through the bore 35 of the lower plug into the tube from which it finds egress through the bore 31 of the upper plug and enters the elongated dome 15. When the chamber within the dome becomes charged with the gas or other fluid such fluid will find egress through the irregular shaped passageway to the outlet pipe 25 for distribution.

The means for indicating the rate of flow of the fluid through the graduated tube is in the form of a plurality of floats, one of which is shown in exaggerated detail in Figure 6. The body portion of the indicator float 39 is cylindrical with a conical lower end 40 and a wide head 41. The interior of the float is hollow and the lower margin of the head is provided with a plurality of obliquely disposed pockets or kerfs 42. The float is light in weight and its weight may readily be controlled by adding to or by removing a portion of its inner surface. The diameter of the float is less than the inside diameter of the lower portion of the tube 27 so that the fluid will readily pass around the head between the latter and the inner surface of the tube. When the fluid enters the tube the float will rise and, on account of its peculiar construction, will rotate or spin. When the flow increases, the float will rise in the tube so that the rate of flow may be determined by the graduations of the scale on the tube. The transverse V-shaped channels 32 and 36 at the inner ends of the plugs 29 and 33 permit a float to rest against adjacent portions of the plugs and also permit the fluid to pass around the float either from the bore 35 in the lower plug or into the bore 31 of the upper plug.

As shown, I have provided a plurality of floats, preferably two in number and these floats are made similar to each other except that the upper float is lighter in weight than the lower float and these weights are definitely and accurately proportioned with respect to each other so that when the upper float approaches its limit of rise the lower float will begin its upward movement. In order to proportion the weight of these floats I prefer to make the upper float of hard rubber or other similar material and the lower float I prefer to make of a metal such as silver. Thus the floats are of contrasting or different colors and may be readily distinguished the one from the other. The lighter float becomes operative and rises in the tube as soon as the fluid begins to flow into the tube and its position in the tube will indicate the millimeters or pounds of chlorine passing through the tube per unit of time. When the float reaches its maximum of travel it will be at or near the top of the tube. If the flow of fluid increases beyond the maximum of travel of the upper float, the lower or heavier float will thereupon begin to rise until it reaches its maximum of travel. It will be seen each float operates independently of the other, and since the floats are of different weights they are charted upon different capacity curves. There is however, in order to insure accurate reading, an overlapping of movement of the respective floats. In order to do this however the floats are proportioned and calibrated so that the lower heavier float will begin its rise prior to the lighter upper float reaching its maximum movement. This stage is illustrated in Figure 4. Figure 3 shows the lighter upper float beginning its upward movement, and Figure 5 shows the lighter float stopped at the top of the tube with the heavier lower float approaching its maximum of movement. For purpose of identification the floats in Figure 1 to 5 are identified as A and B, the former being the designation for the upper lighter float and the latter being the designation for the lower heavier float.

What I claim as new is:

1. A flow-metering apparatus embodying a gauge-tube adapted to be traversed by a fluid in variable quantities; and floats of different specific gravities disposed constantly in superposed relation to each other within said tube and adapted to be successively moved by the fluid to indicate the flow-rate thereof; whereby the heavier float will remain at rest during the major portion of the movement of the lighter float and thereafter travel towards said lighter float.

2. A flow-metering apparatus embodying a gauge-tube through which a fluid is adapted to pass in variable quantities; and two superposed freely-movable members disposed constantly within said tube, the upper member adapted to be separated from the lower member and elevated by the fluid towards the top of said tube prior to the elevation of the lower member by the fluid, whereby the flow-rate of the fluid is indicated in succession by the upper and by the lower member.

ROY B. EVERSON.